(12) United States Patent
Eves et al.

(10) Patent No.: US 7,370,628 B2
(45) Date of Patent: May 13, 2008

(54) METHOD FOR ASSISTING WITH HEATING A CATALYTIC CONVERTER OF AN INTERNAL COMBUSTION ENGINE

(75) Inventors: Brian Eves, Basildon (GB); Dirk Borrmann, Huerth (DE); Gary Peirce, Chelmsford (GB); Franz Brinkmann, Huerth-Efferen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 75 days.

(21) Appl. No.: 11/359,176

(22) Filed: Feb. 22, 2006

(65) Prior Publication Data
US 2006/0185351 A1    Aug. 24, 2006

(51) Int. Cl.
*F02B 5/02* (2006.01)
(52) U.S. Cl. ............... 123/295; 123/299; 123/305
(58) Field of Classification Search ........ 123/295–305, 123/458, 446, 456, 500, 501, 506; 251/129.03, 251/129.07; 137/614.2, 614.19
See application file for complete search history.

(56) References Cited

U.S. PATENT DOCUMENTS

| | | | |
|---|---|---|---|
| 5,207,058 A | | 5/1993 | Sasaki et al. |
| 5,231,962 A | * | 8/1993 | Osuka et al. ............... 123/299 |
| 6,370,869 B1 | | 4/2002 | Hirota et al. |
| 6,964,256 B2 | * | 11/2005 | Kataoka et al. ............ 123/295 |
| 7,073,479 B2 | * | 7/2006 | Kohler et al. ............... 123/295 |
| 2001/0050068 A1 | * | 12/2001 | Kruse ........................ 123/295 |
| 2004/0129245 A1 | * | 7/2004 | Hitomi et al. .............. 123/299 |
| 2005/0161018 A1 | | 7/2005 | Tomita |
| 2005/0211218 A1 | * | 9/2005 | Liu et al. .................... 123/299 |

FOREIGN PATENT DOCUMENTS

WO    WO 2004/072461    *    8/2004

* cited by examiner

*Primary Examiner*—Erick Solis
(74) *Attorney, Agent, or Firm*—Diana D. Brehob

(57) ABSTRACT

The invention relates to a method for heating a catalytic converter which is arranged in the exhaust-gas path of an internal combustion engine with direct injection and spark ignition. In the method, a first fuel injection takes place in the intake stroke (E), whereas a second fuel injection begins in the combustion stroke after top dead center and prior to the spark ignition of the air/fuel mix. It is preferable for the second fuel injection to continue beyond the ignition instant until the pressure in the combustion chamber reaches the fuel injection pressure.

14 Claims, 1 Drawing Sheet

METHOD FOR ASSISTING WITH HEATING A CATALYTIC CONVERTER OF AN INTERNAL COMBUSTION ENGINE

FIELD OF INVENTION

The invention relates to a method for controlling a temperature of a catalytic converter which is arranged in the exhaust-gas path from an internal combustion engine with direct injection and spark ignition, and more particularly to controlling fuel injection into the engine such that the temperature of the converter is increased.

BACKGROUND AND SUMMARY OF THE INVENTION

A large proportion of the emissions from an internal combustion engine are formed before the catalytic converter has reached its operating temperature during a cold start. Therefore, to be able to comply with the increasingly stringent emission regulations for motor vehicles, it is desirable for a catalytic converter to be heated as quickly as possible.

In this respect, EP 1 108 873 B1 discloses a method for heating a catalytic converter which is arranged in the exhaust-gas path of an internal combustion engine with direct injection and spark ignition, with a first fuel injection taking place in the compression stroke before top dead center of the respective piston, the air/fuel mix which is formed being spark-ignited and a second, postinjection of fuel being carried out between approx. 25° and 100° after top dead center. Furthermore, the postinjection brings the initially still lean air/fuel mix up to stoichiometric or rich (enriched) ratios.

The inventors herein have recognized an improved method for quickly heating a catalytic converter. Accordingly, a method for heating a catalytic converter which is arranged in the exhaust-gas path of an internal combustion engine with direct injection and spark ignition, includes a first fuel injection taking place before top dead center; and a second fuel injection taking place in the combustion stroke after top dead center, wherein the second fuel injection begins prior to ignition of the fuel.

The method according to the invention can be used in particular to heat a catalytic converter which is arranged in the exhaust-gas path of an internal combustion engine with direct injection and spark ignition. Heating of this type is required, for example, during an engine cold start in order for the operating temperature of the catalytic converter to be reached as quickly as possible and therefore for the removal of harmful emissions from the exhaust gases to be effected as quickly as possible. In the method, the injection of the fuel into the respective combustion chambers of the internal combustion engine is divided into at least two individual injections, a first fuel injection taking place before the piston reaches top dead center at the end of the compression stroke. Furthermore, a second fuel injection takes place after the piston has moved beyond top dead center and is therefore in the combustion stroke (also known as the expansion or working stroke). According to the invention, the second fuel injection is to begin prior to ignition of the fuel. An advantage of this invention is that it allows the combustion of the fuel to be very strongly delayed, with a high utilization of the fuel, which in turn correspondingly increases the exhaust gas temperature and therefore heats the catalytic converter quickly. The second fuel injection, which has commenced prior to the spark ignition, during the combustion stroke generates a region within the fuel chamber which has an enriched air/fuel mix which is readily ignited and causes the combustion to rapidly progress into the remaining regions of the combustion chamber, in which the typically lean air/fuel mix from the first injection operation is located. It has been found that this effect advantageously occurs substantially independently of the design of the combustion chamber. For example, the cylinder head may be designed in a conventional way, and the top side of the piston may be flat, concavely recessed or elevated in the shape of a roof. Accordingly, the fuel can be transported from the fuel injector to the spark plug by one or a combination of the methods known for this purpose, i.e. with guidance by the walls of the combustion chamber ("wall-guided"), by turbulence within the combustion chamber ("air-guided") or by the shape and direction of the fuel jet ("jet-guided").

The first fuel injection preferably takes place as early as during the intake stroke of the associated piston, i.e. when the piston is moving from the (previous) top dead center to the bottom dead center and in the process draws in fresh air through the open intake valve. The incoming flow of air leads to the formation of considerable turbulence, which brings about a good distribution of the fuel from the first injection.

In the first injection, the quantity of fuel is preferably such that it leads to the formation of a lean air/fuel mix in the associated combustion chamber. With a lean mix of this type, the risk of spontaneous ignition is ruled out or minimized. The first fuel injection may preferably comprise between 50% and 80% of the total quantity of fuel injected in the corresponding working stroke of the respective piston.

In a preferred embodiment of the method, the ignition of the fuel takes place between approx. 10° and 40°, preferably between approx. 25° and 30° after top dead center of the piston, in the combustion stroke. The result of such a delayed ignition is that the exhaust gases from the combustion are at a high temperature, the heat quantity which is contained in the exhaust gas being approximately proportional to the extent to which the ignition is delayed.

In another advantageous embodiment of the method, the second fuel injection begins between 0° and approx. 40°, preferably between 0° and approx. 25°, after top dead center of the corresponding piston in the combustion stroke. The second injection may optionally also end again within the angle ranges mentioned.

According to another embodiment, the second fuel injection extends beyond the instant of ignition of the air/fuel mix.

It is advantageous for the composition of the air/fuel mix, as seen over a working stroke of a piston, to be lean on average (in terms of time and space, i.e. within the combustion chamber), in order to achieve optimum utilization of fuel.

The invention also relates to an internal combustion engine with a catalytic converter arranged in the exhaust-gas path. The internal combustion engine has at least one cylinder, which includes a piston, a fuel injector for the direct injection of fuel, and an ignition device for the spark ignition of the fuel. A controller is connected to the fuel injector and the ignition device and, if appropriate, further actuators and/or suitable sensors, in order to control the instants and quantitative proportions of fuel injections as well as the instants of ignition. The controller can control the fuel injector in such a way that a first fuel injection takes place before top dead center of the associated piston and a second fuel injection begins in the combustion stroke after top dead center and before ignition of the fuel.

In a preferred embodiment of the internal combustion engine, the system further includes at least one pressure sensor coupled to one of its combustion chambers for measuring the combustion pressure in this combustion chamber. In this case, the engine controller is preferably designed to terminate the second fuel injection when the measured pressure in the combustion chamber exceeds a predetermined threshold value. Said threshold value in this case typically corresponds to the fuel injection pressure which the fuel injector provides or the maximum fuel injection pressure which it can provide, minus a safety margin to account for any tolerances.

The above advantages and other advantages, and features of the present invention will be readily apparent from the following detailed description of the preferred embodiments when taken in connection with the accompanying drawings, and from the claims.

BRIEF DESCRIPTION OF DRAWINGS

The advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

Figure 1:
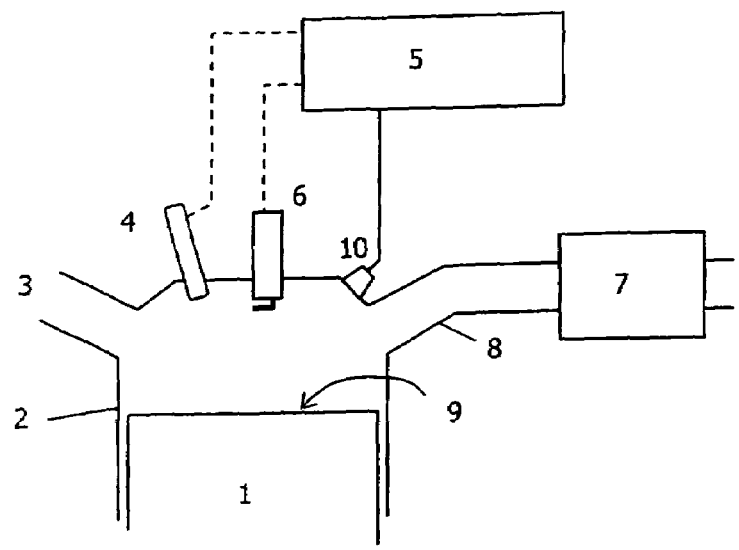
FIG. 1 diagrammatically depicts a section through the cylinder of an internal combustion engine with an engine controller according to the invention.

FIG. 1 diagrammatically depicts a section through one of a number of cylinders 2 of an internal combustion engine. A reciprocating piston 1 with a substantially flat top side 9 is arranged in the cylinder 2. Alternatively, the top side of the piston could also be concavely recessed or elevated in the shape of a roof. The cylinder head, which is designed in the shape of a roof, has an intake 3 for air, an exhaust 8 for exhaust gas and a fuel injector 4 and a spark plug 6. Typically, in each case two intake valves and two exhaust valves (not shown) are provided, and the spark plug 6 is arranged substantially centrally. An engine controller 5 is coupled to the fuel injector 4 and the ignition device 6 in order to control the ignition instant and the instants and quantities of the fuel injections. The engine controller 5 receives signals from a pressure sensor 10, which is coupled to the combustion chamber in order to measure the combustion pressure.

FIG. 1 also illustrates a catalytic converter 7 arranged in the exhaust-gas path 8. In the event of an engine cold start, it is important for the catalytic converter 7 to reach its operating temperature as quickly as possible, so that it can remove pollutants from the exhaust gas. In this context, an increased exhaust gas temperature and therefore faster heating of the catalytic converter 7 are desirable, by delaying the ignition instant of the air/fuel mix in the cylinder 2 during the cold start, in which case the heat which is supplied to the catalytic converter 7 is substantially proportional to the ignition delay which is set. However, the ignition delay must not be so great as to potentially impair the stability of engine running. In this respect, an ignition at approx. 10° to 15° after top dead center of the piston can be achieved in internal combustion engines with injection in the intake manifold (PFI: port fuel injection). Multiple injections of fuel allow stable operation up to approx. 25° to 30° after top dead center in internal combustion engines with direct injection and spark ignition (DISI: direct injection spark ignition) and with a concave hollow in the piston for diverting the fuel toward the ignition device; generally, two injections are carried out, the first of which takes place in the intake stroke and contains between 50 and 80% of the total quantity of fuel, while the remaining quantity of fuel is injected in the compression stroke between approx. 60° and 20° before top dead center. Depending on the design of the combustion chamber, the fuel of the second injection can be guided to the spark plug in various ways, for example by wall-guidance, air-guidance or jet-guidance. In any event, an enriched core of an air/fuel mix, which can easily be ignited, is formed, with the combustion then being transferred to the surrounding lean mix in the combustion chamber. Since the initially rich combustion takes place more quickly than the combustion of a conventional 5% strength lean mix, it is possible to achieve greater ignition delays without drawbacks for fuel economy.

Figure 2:
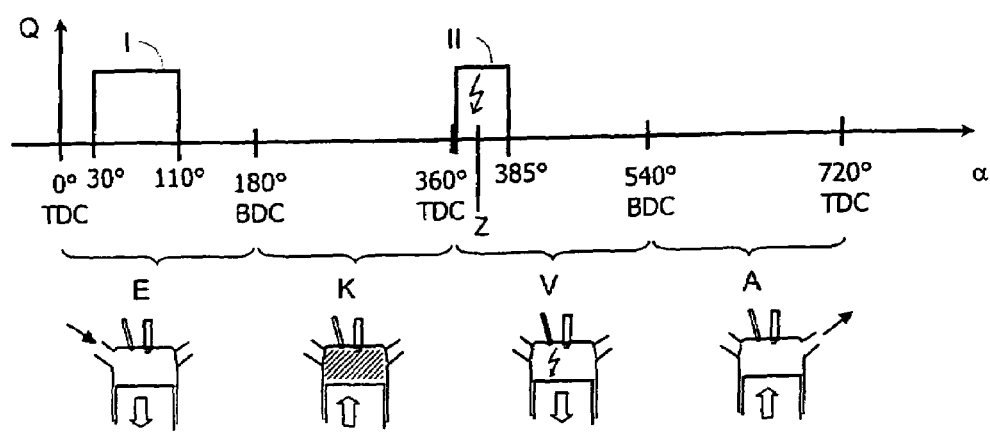
FIG. 2 shows the position of the fuel injections and the ignition instant over the course of time as a function of the crankshaft angle α.

As an improvement to the method described above, in the present case it is proposed that the second fuel injection be carried out after top dead center of the respective piston. In this respect, FIG. 2 shows, in a schematic diagram, the profile of the fuel injections (vertical axis: fuel flowrate Q) against the crankshaft angle α measured progressively over the course of time. This figure illustrates one complete cycle of a piston, which starts with an intake stroke E, in which the piston is moving from top dead center TDC toward bottom dead center BDC and in the process draws fresh air into the combustion chamber through the open intake valve. In the subsequent compression stroke K, the piston moves from bottom dead center BDC to top dead center TDC and, with the valves closed, compresses the gas mix in the combustion chamber. During the subsequent combustion stroke V, the piston moves back from top dead center TDC to bottom dead center BDC, with the gas mix in the combustion chamber being ignited by the spark plug at an instant Z. In the final exhaust stroke A, the piston moves back from bottom dead center BDC to top dead center TDC and in the process discharges the combustion exhaust gases through the open exhaust valve into the exhaust-gas path.

In the embodiment of the method illustrated in FIG. 2, a first fuel injection I takes place in the intake stroke E, for example between approx. 30° and approx. 110° after top dead center TDC. The quantity of the first fuel injection I is in this case such that the resulting air/fuel mix in the combustion chamber is lean.

After the piston has moved beyond top dead center TDC at the end of the compression stroke K, a second fuel injection II is carried out, which may extend, for example, from approx. 0° to approx. 25° after top dead center TDC. It is preferable for this second fuel injection II to extend beyond the instant Z of ignition by the spark plug.

The control of the injection duration can also be determined with the aid of the pressure rise within the cylinder which is generated by the incipient combustion. To allow the engine controller 5 to recognize this pressure rise and to terminate the fuel injection in good time, it is advantageously in each case connected to a pressure sensor 10 in the combustion chambers of the internal combustion engine (FIG. 1).

This concludes the description of the invention. The reading of it by those skilled in the art would bring to mind many alterations and modifications without departing from the spirit and the scope of the invention. Accordingly, it is intended that the scope of the invention be defined by the following claims:

The invention claimed is:

1. A method for heating a catalytic converter which is arranged in the exhaust-gas path of an internal combustion engine with direct injection and spark ignition, comprising:
   a first fuel injection taking place before top dead center of the compression stroke; and
   a second fuel injection taking place in the combustion stroke after top dead center, wherein the second fuel injection begins prior to ignition of the fuel and continues until the instant of ignition.

2. The method as claimed in claim 1, wherein the first fuel injection takes place during the intake stroke.

3. The method as claimed in claim 2, wherein the first fuel injection leads to the formation of a lean air/fuel mix.

4. The method as claimed in claim 3, wherein the ignition of the fuel takes place between 10° and 40° after top dead center.

5. The method as claimed in claim 3, wherein the ignition of the fuel takes place between 25° and 30° after top dead center.

6. The method as claimed in claim 3, wherein the second fuel injection begins between 0° and 40° after top dead center (TDC).

7. The method as claimed in claim 3, wherein the second fuel injection begins between 0° and 25° after top dead center (TDC).

8. A method for heating a catalytic converter which is arranged in the exhaust-gas path of an internal combustion engine with direct injection and spark ignition, comprising:
   a first fuel injection taking place before top dead center of the compression stroke; and
   a second fuel injection taking place in the combustion stroke after top dead center, wherein the second fuel injection begins prior to ignition of the fuel and continues beyond the instant of ignition.

9. The method as claimed in claim 8, wherein the air/fuel mix is on average lean.

10. The method as claimed in claim 9, wherein the first fuel injection contains 50-80% of the total fuel quantity.

11. A method for heating a catalytic converter which is arranged in the exhaust-gas path of an internal combustion engine, the fuel being directly injected into engine cylinders and the engine being spark ignited, comprising:
    injecting fuel in a first injection before top dead center of the compression stroke;
    injecting fuel in a second fuel injection after top dead center of the compression stroke; and
    firing a spark plug during said second fuel injection.

12. The method of claim 11, further comprising: measuring combustion pressure with a pressure sensor in a combustion chamber.

13. The method of claim 12, further comprising: terminating said second fuel injection based on a signal from said pressure sensor.

14. The method of claim 13 wherein incipient combustion is determined by said pressure sensor and said termination is based on sensing said incipient combustion.

* * * * *